(12) United States Patent
Tu et al.

(10) Patent No.: US 7,606,937 B2
(45) Date of Patent: Oct. 20, 2009

(54) NEXT SITE FOR DISTRIBUTED SERVICE CONNECTIONS

(75) Inventors: Weiqing Tu, Redmond, WA (US);
William B. Lees, Redmond, WA (US);
Billy J. Fuller, Woodinville, WA (US);
Nathan D. Muggli, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 549 days.

(21) Appl. No.: 11/292,771

(22) Filed: Dec. 2, 2005

(65) Prior Publication Data
US 2007/0130304 A1 Jun. 7, 2007

(51) Int. Cl.
*G06F 15/173* (2006.01)
(52) U.S. Cl. .................................. 709/241; 709/238
(58) Field of Classification Search .............. 709/203, 709/238, 241
See application file for complete search history.

(56) References Cited

U.S. PATENT DOCUMENTS

| | | | |
|---|---|---|---|
| 5,483,652 A * | 1/1996 | Sudama et al. ................ 707/10 |
| 5,892,946 A * | 4/1999 | Woster et al. ............... 719/316 |
| 6,012,096 A * | 1/2000 | Link et al. ................... 709/233 |
| 6,304,913 B1 * | 10/2001 | Rune ........................... 709/241 |
| 6,792,421 B2 | 9/2004 | Wyse | |
| 7,089,301 B1 * | 8/2006 | Labio et al. ................. 709/224 |
| 2001/0039587 A1 | 11/2001 | Uhler et al. | |
| 2002/0051178 A1 | 5/2002 | Nakayasu et al. | |
| 2002/0147774 A1 * | 10/2002 | Lisiecki et al. ............. 709/203 |
| 2002/0198734 A1 | 12/2002 | Greene et al. | |
| 2003/0009401 A1 * | 1/2003 | Ellis ............................. 705/35 |
| 2003/0041130 A1 * | 2/2003 | Harrisville-Wolff et al. . 709/221 |
| 2003/0236779 A1 | 12/2003 | Choi et al. | |
| 2004/0019659 A1 * | 1/2004 | Sadot et al. ................. 709/219 |
| 2005/0128944 A1 | 6/2005 | Zhang et al. | |
| 2005/0172011 A1 * | 8/2005 | Gourlay et al. ............. 709/219 |

(Continued)

FOREIGN PATENT DOCUMENTS

KR 1020000052556 8/2000

(Continued)

OTHER PUBLICATIONS

Christos Doulkeridis, Efstatios Valavanis and Michalis Vazirgiannis Database Systems Laboratory Department of Informatics Athens University of Economics and Business (AUEB) 10434 Athens, Greece "Towards a Context-Aware Service Directory", pp. 1-12, http://softsys.cs.uoi.gr/dbglobe/publications/DVV03_TES.pdf.

(Continued)

*Primary Examiner*—Jeffrey Pwu
*Assistant Examiner*—Joe Chacko
(74) *Attorney, Agent, or Firm*—Workman Nydegger (57) ABSTRACT

Registering a client with a distributed service. A method may be practiced, for example, in a network computing environment including a client at a local site and a number of distributed services at a number of remote sites. The method includes pinging one or more distributed services at one or more remote sites. A message is received from a distributed service from among the one or more distributed services. The message specifies an optimal remote site. The method further includes registering with a distributed service at the optimal remote site.

12 Claims, 3 Drawing Sheets

U.S. PATENT DOCUMENTS

2005/0185660 A1    8/2005    Ekberg et al.

FOREIGN PATENT DOCUMENTS

WO    WO03/055178 A1    7/2003

OTHER PUBLICATIONS

Robert Bram, Jana Dospisil acm Portal The Guide to Computing Literature Practicing software engineering in the 21$^{st}$ century "A Framework for Intelligent Service Discovery", pp. 1-3 Year of Publication: 2003 http://portal.acm.org/citation.cfm?id=960085&coll=Portal&dI=GUIDE&CFID=60346279&CFTOKEN=49338138.

Fabian E. Bustamante, Patrick Widener and Karsten Schwan College of Computing Georgia Institute of Technology Atlanta, Georgia 30332, USA "Scalable Directory Services Using Proactivity", pp. 1-12 2002 IEEE http://portal.acm.org/citation.cfm?id=762786&coll=Portal&dI=GUIDE&CFID=60346279&CFTOKEN=49338138.

Microsoft TechNet "Windows 2000 DNS", pp. 1-47 http://www.microsoft.com/technet/prodtechnol/windows2000serv/plan/w2kdns2.mspx#EEAA.

TOGGIT Redmond EXAMS Exam 070-217 Implementing and Administering a Microsoft Windows 2000 Directory Services Infrastructure Study tools for exam 070-217 Implementing and Administering a Microsoft Windows 2000 Directory Services Infrastructure "Study Guide for MSCE Exam 70-217", pp. 1-20 http://www.toggit.com/217/217tguide.asp.

* cited by examiner

NEXT SITE FOR DISTRIBUTED SERVICE CONNECTIONS

BACKGROUND

Background and Relevant Art

Modem computer systems allow for the interchange of data and resources through network environments. For example, a modem computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

Networks vary in size. Smaller networks include Local Area Networks (LANs). Examples of LANs include home networks and small business networks where the network is at a single home or business site. Larger networks include Wide Area Networks (WANs). One common example of a WAN is the ubiquitous Internet. Another example includes a collection of LANs interconnected to create an. enterprise network. Similar to an enterprise network is a forest. A forest is a group of systems under a central control.

When LANs are interconnected to create an enterprise network, hubs may be used to connect branch offices to provide connectivity for the enterprise network. Typically, the enterprise network includes a number of distributed services located throughout the enterprise network. Clients on the enterprise network can register with one of the distributed services. The distributed service to which a client is registered provides routing capabilities that allow messages from the registered client to be delivered to other clients in the enterprise network, and allow messages from other clients to be delivered to the registered client. The distributed service may include functionality for providing security for the network. For example, the distributed service may include functionality for authenticating communications on the network to prevent unauthorized and/or malicious communications from being transmitted on the network.

The enterprise network may be arranged as a collection of sites, where each site is a range of network addresses. For example, a site may be defined as a collection of Internet Protocol (IP) addresses. Often, IP addresses are assigned based on geographical and/or logical proximity. Thus, clients and distributed services with similar IP address, and more particularly IP addresses within the same site, will often be geographically and/or logically near one another. Because much or all of the communication to a client passes through the distributed service to which the client is registered, it is often advantageous to register the client with a distributed service in the same site as the client. One advantage of close proximity of client and distributed service is the reduction of overall network traffic because each communication to and from the client will not need to be routed to a distributed service through a number of network connections to reach a remotely located distributed service.

Unfortunately however, situations may arise where a client is not able to register or communicate with a distributed service at the same site as the client. When this occurs, a client may randomly select another distributed service at another site with which to register. Understandably, this may result in a client registering with a distributed service that is geographically and/or logically far removed from the client.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of registering a client with a distributed service. The method may be practiced, for example, in a network computing environment including a client at a local site and a number of distributed services at a number of remote sites. The method includes pinging one or more distributed services at one or more remote sites. A message is received from a distributed service from among the one or more distributed services. The message specifies an optimal remote site. The method further includes registering with a distributed service at the optimal remote site.

Another embodiment described in more detail herein includes a method of providing from a distributed service at a remote site, a client at the local site with an indication of an optimal remote site. The method may be practiced, for example, in a network computing environment including a client at a local site and a number of distributed services at a number of remote sites. The method includes receiving a ping from the client. The optimal remote site is determined based on information about the client and information about the link connecting the client to the optimal remote site. The method further includes sending a message to the client. The message specifies the optimal remote site.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment described herein is directed towards a system where distributed services on an enterprise network can provide an indication to a client that a distributed service is located at a remote site from the client that is an optimal remote site. If a client cannot register with a distributed service at the same site as the client, the client will then attempt to register with a distributed service at the optimal remote site. The optimal remote site may be determined on a per client basis. For example, each client on an enterprise network has an optimal remote site that may or may not be the same optimal remote site for other clients on the enterprise network. A site may be determined to be the optimal remote site by reference to various factors such as characteristics of the client, characteristics of systems at the remote site, and characteristics of one or more links interconnecting the client with the optimal remote site. For example, each link interconnecting a client with a remote site may be assigned an index number that is comparable to other links on the enterprise network. Each index number may be determined by reference to various characteristics as applied in a formulaic way to arrive at the index number. Formulas may include for example reference to factors such as reliability of a link, economic cost per minute or measure of data on the link, latency and performance of the link, user preferences, security of the link, network equipment, administrative costs, bandwidth of a link, and conflicting uses of a link. Distributed services in the enterprise network may include a table that includes link to link index numbers as well as an ability to calculate an index number for a client to a particular site. Index numbers calculated for links between the client and different sites can be compared such that a distributed service can return a message to the client indicating the optimal remote site is the site to with the most optimal index number.

Figure 1:
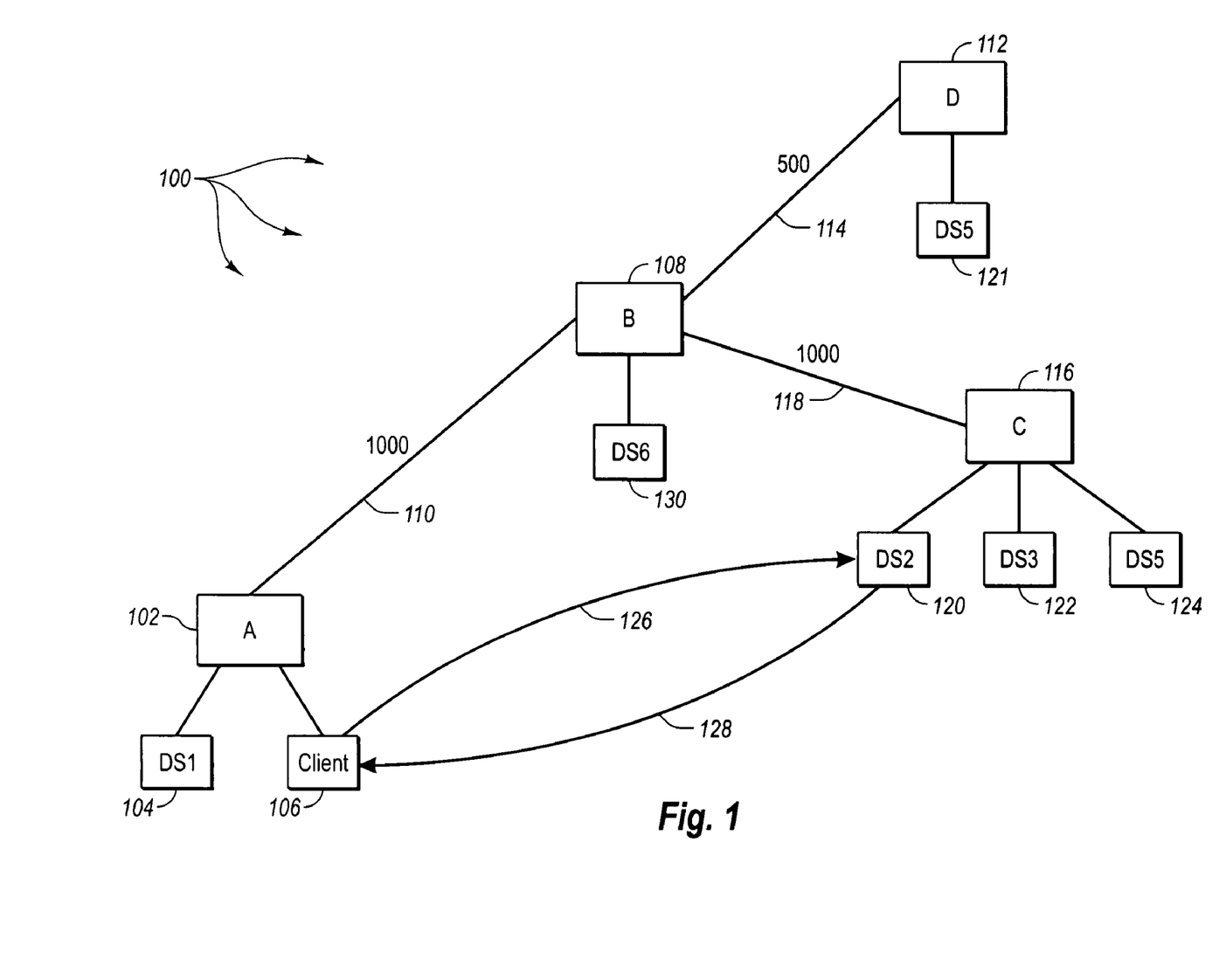
FIG. 1 illustrates an enterprise network.

Referring now to FIG. 1, a more detailed example will be illustrated using a diagrammed reference to an enterprise network 100. The enterprise network 100 is shown as including a number of sites including site A, site B, site C, and site D. Local site A 102 includes a distributed service 104 that may include various services that can be provided to clients on the enterprise network 100. FIG. 1 further illustrates a client 106 at local site A 102. Local site A 102 is connected to remote site B 108 by a link 110. Remote site B 108 is connected to remote site D 112 by a link 114. Remote site B 108 is also connected to remote site C 116 by a link 118. Remote site D 112 is shown as including a distributed service 121. Remote site C is shown as including a number of distributed services including distributed service 120, distributed service 122, and distributed service 124.

Under normal operation, the client 106 prefers to register with the distributed service 104 located at a local site, local site A 102, of the client 106. However, situations may occur where distributed service 104 is not available to register clients. The client 106 will first attempt to register with a distributed service at local site A 102. When the client 106 realizes that no distributed services are available for registering clients at local site A 102, the client 106 will attempt to discover a next closest site for registering to a distributed service at the next closest site.

In the example shown in FIG. 1, the client 106 sends a ping 126 to a distributed service 120 in the enterprise network 100. Selection of distributed service 120 as the site to ping may be performed in one embodiment in a random fashion by the client referencing a record of distributed services in the enterprise network 100. Once the client 106 has sent a ping 126 to the distributed service 120, the client will wait for a short interval to allow the distributed service 120 to reply. If the distributed service 120 does not reply, the client 106 can ping other distributed services on the enterprise network 100. However, for this example it is assumed that distributed service 120 is able to reply to the ping 126 from the client 106. A message sent as part of the ping 126 may include an indication to the distributed service 120 that the client 106 has the capabilities to support and to communicate using messages where the distributed service 120 returns an indication of an optimal remote site for the client 106 to contact a distributed service. For example, the client 106 may include with a message that is part of the ping 126 a flag that indicates its ability to receive an indication of an optimal remote site.

The distributed service 120, by reference to the flag, can determine that a message 128 should be sent to the client 106 that includes an indication of an optimal remote site for the client 106. In alternative embodiments, the distributed service 120 may not reference a flag sent in the ping 126 but may rather assume that all clients and distributed services in the enterprise network 100 support the ability to receive optimal remote site information. Providing the flag by the client 106 and a reference to the flag by the distributed service 120, in one embodiment, simply provides for backward compatibility such that systems that include the functionality to request optimal remote site information and systems that include functionality to provide optimal remote site information can be used with systems that do not include such functionality.

A distributed service, such as distributed service 120 or the other distributed services shown in FIG. 1 may include functionality for creating and/or storing a mapping table which includes indexes which may be used to determine an index number for a link between the client 106 and the various sites local site A 102, remote site B 108, remote site D 112, remote site C 116 in the enterprise network 100. For example, as illustrated and FIG. 1, the link 110 between local site A 102 and remote site B 108 has an index cost of 1000. This number represents the results of an algorithm that determines an index cost based on factors such as link reliability, link cost, physical proximity between sites, and the like. The index value 1000may be stored in a cost mapping table stored at each of the distributed services in the enterprise network 100. The link 114 between remote site B 108 and remote site D 112 has a cost index of 500as illustrated in FIG. 1. The link 118 between remote site B 108 and remote site C 116 has a cost index of 1000as illustrated in FIG. 1.

Illustrating now the functionality of one embodiment, the client 106 sends a ping 126 to distributed service 120. The ping 126 may include information about the location of the client 106. For example, the ping 126 may include the IP address of the client 106. The IP address of the client 106 can be used to identify the client as a member of local site A 102. Knowing that client 106 resides at local site A 102, the distributed service 120 can then calculate the next closest site to the client 106. For example, the distributed service 120 references the cost index table to determine that the client 106 may access remote site B 108 at a cost of 1000. The client 106 may access remote site D 112 at a cost of 1500. The client 106 may access remote site C at a cost of 2000. As such, the distributed service 120 returns a message 128 to the client 106 indicating that remote site B is the closest or optimal remote site for the client 106. The client can then register with distributed service 130 at remote site B 108.

In one embodiment, if the client 106 is unable to register with a distributed service at the optimal remote site, which in this case is remote site B 108, then the client 106 may revert to a scheme whereby the client 106 registers with a random domain controller included in a list of domain controllers.

In one alternative embodiment, the distributed service 120 may provide a ranked listing of closest sites such that if the client 106 fails to connect to a distributed service at the most optimal remote site, remote site B 108, then the client 106 can attempt to contact a distributed service in the next most optimal remote site. For example, the distributed service 120 may return a message 128 that remote site B 108 is the most optimal remote site for connecting to the client 106 (with an index of 1000), remote site D 112 is the next most optimal remote site (with an index of 1500) and remote site C 116 is the next most optimal remote site after remote site D 112 (with an index of 2000). As such, if the client 106 fails to register with the distributed service 130 at remote site B 108, then the distributed service may attempt to register with the distributed service 121 at remote site D 112. If the client 106 fails to register with a distributed service at remote cite D, then the client 106 will attempt to register with a distributed service 120, 122, or 124 at remote site C 116.

The embodiments described above to have been described in general terms. However it should be realized that certain specific embodiments may also be implemented. For example, the embodiments described above may be implemented in an active directory embodiment using the active directory technology available on servers available from Microsoft Corporation of Redmond Wash. For example, the distributed services described previously herein may be embodied as domain controllers at sites in an active directory forest.

Figure 2:
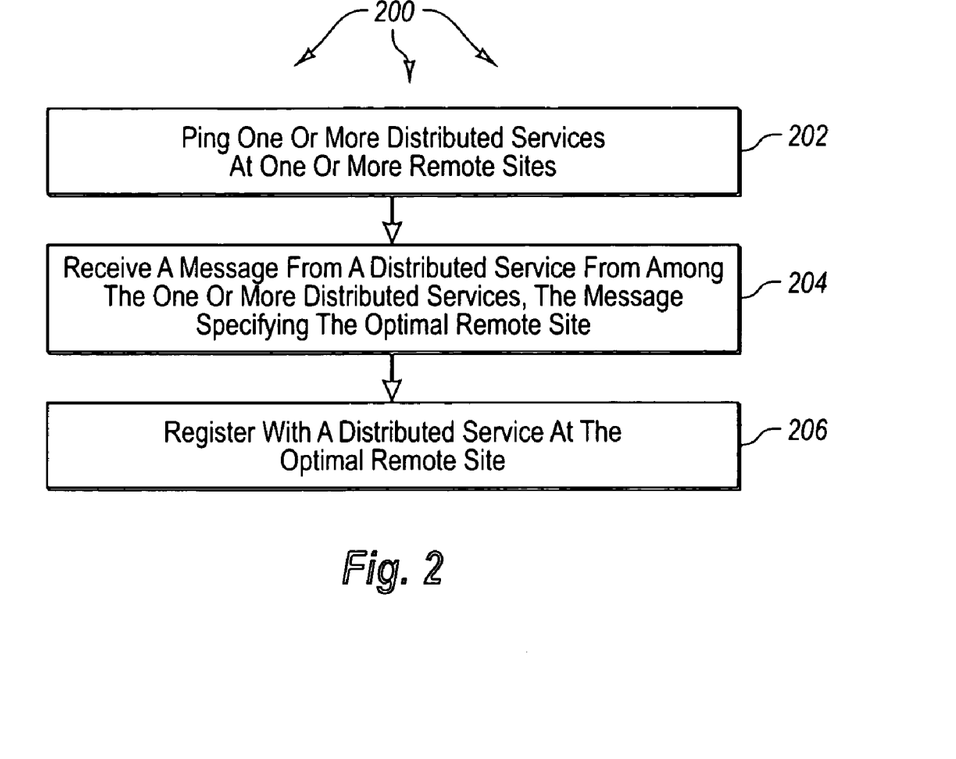
FIG. 2 illustrates a method of registering with a distributed service at a remote site.

Referring now to FIG. 2, a method 200 of registering a client with a distributed service is illustrated. The method 200 may be practiced, for example, in a network computing environment including a client at a local site and a number of distributed services at a number of remote sites. The method of 200 includes an act of pinging one or more distributed services at one or more remote sites to discover a distributed service at an optimal remote site (act 202). Referring once again to FIG. 1, an illustrative example of a client 106 pinging a distributed service 120 at a remote site C 116 is illustrated. As shown in FIG. 1, the client 106 sends a ping 126 to the distributed service 120 at site C. In one embodiment, pinging one or more distributed services at one or more remote sites (act 202) may include sending a flag indicating that the client supports receiving messages specifying the optimal remote site. For example, and referring again to FIG. 1, the ping 126 may include a flag which indicates that the client 106 is able to receive optimal remote site information. If the distributed service 120 supports functionality for delivering optimal remote site information, the distributed service 120 may analyze the ping 126 to determine if the client 106 desires to receive optimal remote site information.

In one embodiment, pinging one or more distributed services at one or more remote sites (act 202) may be performed subsequent to first attempting to contact a distributed service at the same site as the client. For example and referring again to FIG. 1, the client 106 may first attempt to register with the distributed service 104 at the local site A 102. If the distributed service 104 is unavailable or the client 106 is not able to contact the distributed service 104, then the client 106 will send the ping 126 to the distributed service 120 at the remote site C 116.

Referring once again to FIG. 2, the method 200 further includes an act of receiving a message from a distributed service from among the one or more distributed services, the message specifying the optimal remote site (act 204). In one embodiment, the message may be a UDP message. Referring once again to FIG. 1, the distributed service 120 responds to the ping 126 by sending a message 128. The message 128 may include information specifying the optimal remote site from site A 102 to which the client 106 belongs. In the example shown in FIG. 1, the optimal remote site is remote site B 108. In the particular example shown in FIG. 1, remote site B is the optimal remote site because the link connecting the local site A 102 to the remote site B 108 has a lower index than the links to other remote sites 112, 116.

As alluded to previously, index numbers may be used to compare links from local sites to a remote site. As such, the optimal remote site may be determined to be the optimal remote site by virtue of an index comparable with an index for other sites. The index numbers may be calculated by using a number of different factors. For example, the index may be calculated by using at least one of physical proximity of the client to the optimal remote site, economic cost of a link connecting the client to the optimal remote site, reliability of the link, latency and performance of the link, user preferences, security of the link, network equipment, administrative costs, bandwidth of the link or, conflicting uses of the link.

As described above, one factor that may be used in calculating indexes of links connecting sites is a monetary cost of a link. For example, different types of links may have different monetary costs associated with their use. For example, dialup connections, direct Ethernet connections, satellite connections, DSL connections, wireless connections and the like each have a differing monetary cost when compared to one another. In the example shown in FIG. 1 wherein lower index numbers indicate that the link is more optimal, connections that cost less monetarily may result in a lower index number for the link.

As noted previously, another factor that may be used in calculating an index number may be the reliability of the link connecting the client to the optimal remote site. Some types of communication are less reliable than other types of communication. Thus a communication type that is more reliable may result in a lower index number for the link.

Yet another factor that may be used in determining an index number is the latency and performance of the link. Some links are able to transmit data at faster rates than other links. This may be due to the type of technology that is used to create the link, or the amount of traffic on the link, or for other various reasons. Thus, in one embodiment, links with higher performance and lower latency may have lower index numbers.

Another factor that may be used to determine an index for a link relates to the security of the link. For example, certain types of links have higher levels of encryption or are more secure. Often, hardwired links are more secure than wireless links. Certain types of wireless encryption are more secure than other types of wireless encryption. Thus, in one embodiment, more secure links may have a lower index number, or an index indication that the link is more or less optimal, than less secure links.

Yet another factor that may be used to determine an index value for a link relates to the bandwidth of the link. In one embodiment, the bandwidth of the link refers to bandwidth available for servicing additional clients. Thus, in one exemplary embodiment, while a link may have an overall higher bandwidth availability, the link may actually result in a higher index when the link has less available bandwidth because the link is dedicated to serving other clients or services on the network.

Another factor that may be used to determine the index number for a link relates to conflicting uses of the link. For example, some links may be valuable for servicing various types of network traffic and thus should be preserved for those types of network traffic. Thus, a link may receive a higher index value because the link is used for various types of network communications which may be less desirable to have interrupted than other communications on the other links.

The optimal remote site may be determined by identifying the local site by reference to an IP address of the client. For example, and referring again to FIG. 1, the IP address of the client 106 may provide an indication that the client 106 is at the local site A 102. As such, the distributed service 120 can determine the most optimal site by comparing links interconnecting site A 102 to other sites in the enterprise network 100. As discussed previously herein, the index value for the link from site A 102 to cite B 108 is 1000. The index value of the link interconnecting site A 102 to site D 112 is 1500. The index value of the link interconnecting site A 102 to site C 116 is 2000. Thus, the distributed service 120 can determine that the most optimal site for the client 106 is site B 108.

Notably, in the examples shown above, lower index values are illustrated as having a more optimal nature. However, one can imagine scenarios where higher index values are more optimal or other index indicators are used to indicate the optimalness of a link. Thus, the embodiments illustrated herein should not be limited to only embodiments where only lower index values indicate a more optimal link.

The method 200 illustrated in FIG. 2 further includes an act of registering with a distributed service at the optimal remote site (act 206). Thus, as illustrated in FIG. 1, the client 106 may register with the distributed service 130 at the optimal site B 108.

The method 200 may further include reverting to a random pinging method of finding a distributed service if no message indicating an optimal remote site is received. For example, and referring again to FIG. 1, if the distributed service 120 does not support messaging specifying the most optimal site, no message 128 indicating the most optimal site will be received by the client 106. As such, the client 106 may revert to a scheme whereby the client 106 randomly selects a distributed service to register with. In alternative embodiments, the client 106 may ping other distributed services in the enterprise network to discover a distributed service that supports delivering optimal site information.

Figure 3:
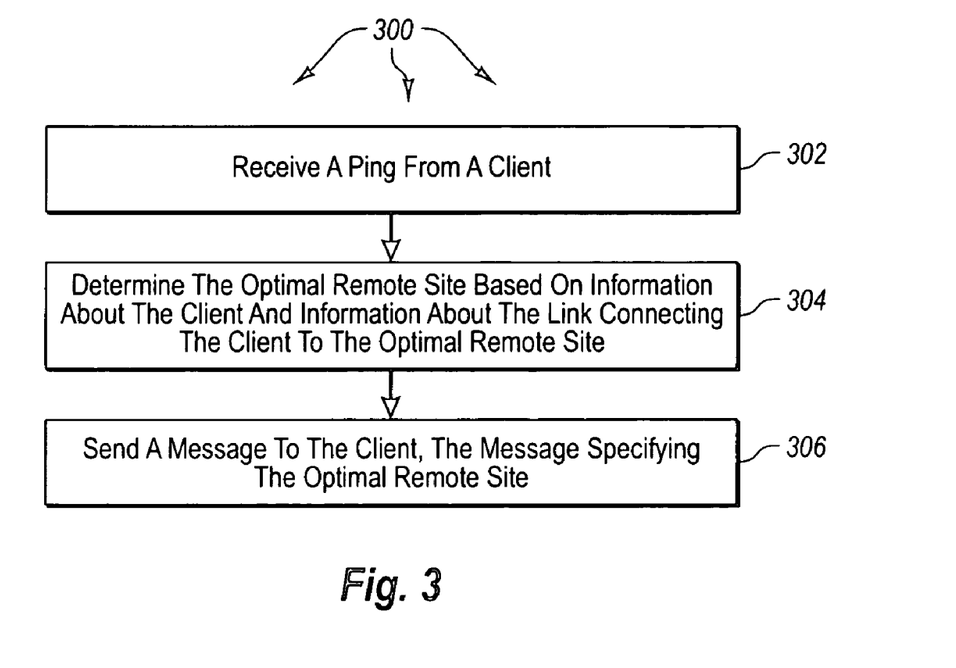
FIG. 3 illustrates a method of communicating a message to a client indicating an optimal remote site.

Referring now to FIG. 3, a method 300 of providing an indication of an optimal remote site to a client is illustrated. The method 300 may be practiced, for example in a network computing environment including a client at a local site and a number of distributed services at a number of remote sites. The method includes an act of receiving a ping from the client (act 302). Referring now to FIG. 1 the distributed service 120 may receive the ping 126 from the client 106. As described previously herein, the ping 126 may include a flag indicating that the client 106 supports receiving messages specifying the optimal remote site.

The method 300 further includes an act of determining the optimal remote site based on information about the client and information about the link connecting the client to the optimal remote site (act 304). Determining the optimal remote site (act 304) may include comparing an index of the optimal remote site to indexes of other sites. The index may be calculated by using physical proximity of the client and the optimal remote site, economic cost of a link connecting the client to the optimal remote site, reliability of the link, latency and performance of the link, user preferences, security of the link, network equipment, administrative costs, bandwidth of the link or, conflicting uses of the link. In one embodiment, the optimal remote site is determined by identifying the local site by reference to an IP address of the client. For example, as shown in FIG. 1, the client 106 may have an IP address that corresponds to an IP address range for site A 102.

In one embodiment, the method 300 may include calculating the index of the optimal remote site. In this embodiment, a distributed service may include program modules or other functionality for calculating the index and numbers used to compare links interconnecting sites. The program modules may accept as input information such as that described previously herein, and may include program modules for calculating an index number based on the input information.

In an alternative embodiment, the method 300 may include receiving a calculated index of the optimal remote site. For instance, the distributed services on the enterprise network may include functionality for receiving index numbers from another agent on the enterprise network where the other agent provides the index numbers for the links interconnecting the sites in the enterprise network.

The method 300 shown in FIG. 3 further includes an act of sending a message to the client, the message specifying the optimal remote site (act 306). As shown in FIG. 1, and alluded to previously herein, the distributed service 120 may deliver a message 128 to the client 106 wherein to message 128 provides information specifying an optimal remote site. For example, in the example shown in FIG. 1, the message 128 may specify that the optimal remote site for client 106 is site B 108. In one embodiment, sending a message to the client (act 306) may include sending a UDP message.

Figure 4:
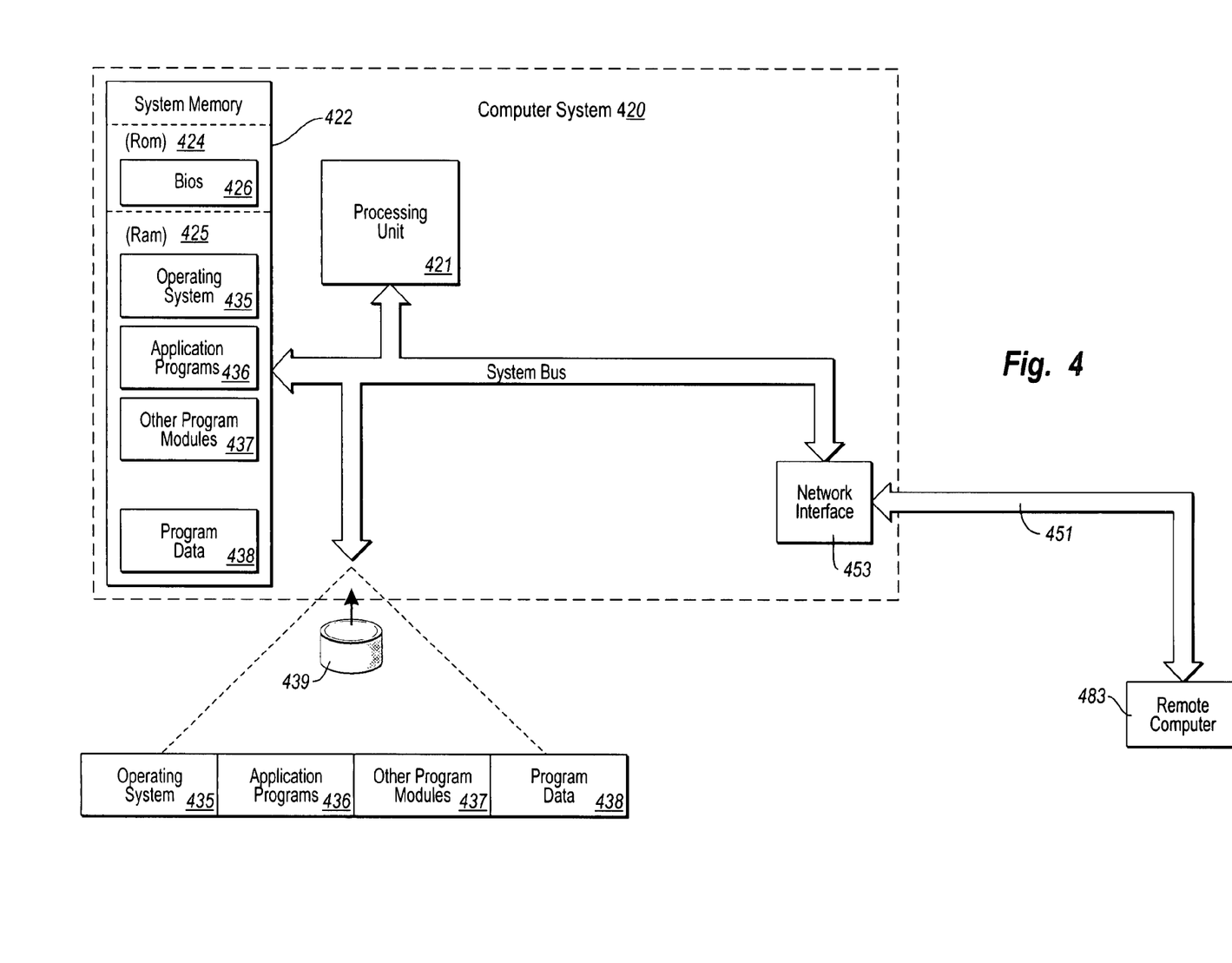
FIG. 4 illustrates a system where certain embodiments may be practiced.

Referring now to FIG. 4, an exemplary computer system 420 is illustrated. The computer system 420 may include functionality for pinging distributes services to discover an optimal remote site and for registering with a distributed service. The distributed services, while they may be embodied as separate system are illustrated in FIG. 4 collectively as the remote computer system 483. The computer system 420 may include a processor 421. The processor 421 is configured to operate on computer executable instructions. For example, the processor may be configured to run instructions stored in the BIOS 426 in ROM 424, as part of an operating system 435 and various program modules including application programs 436 and other program modules 437. These program modules may be stored on non-volatile persistent storage such as a hard disk 439 or other media where they may be loaded into system memory 422 for execution by the processor.

The computer system 420 also includes, as alluded to above, storage media configured to store data and program modules. For example, application programs 436 can be stored on the hard drive 439 where they can be loaded into the RAM 425 of the system memory 422. Similarly, program data 438 may be stored on the hard drive 439 and stored in the RAM 425 of the system memory 422.

A storage medium may include one or more program modules 437 configured to ping one or more distributed services at one or more remote sites. The program modules may be further configured to receive a message from a distributed service from among the one or more distributed services, where the message specifies an optimal remote site. The program one or more modules may be further configured register with a distributed service at the optimal remote site.

In some embodiments, the distributed services are represented by the remote computer system 483 connected to the computer system 420 via a network interface 453 and network connection 451. The network connection 451 may be any of the various network connections that exist at the present time or may exist in the future. Present connections include Bluetooth connections, wired and wireless connections and various other connections. However, embodiments are not limited to the network connections recited herein, but may function with other, yet undiscovered connections.

In one embodiment, the one or more program modules 437 may be further configured to send an indication that the computer system 420 is capable of processing optimal site information. In yet another embodiment, the program modules may be configured to revert to a random pinging method of finding a distributed service if no message indicating an optimal remote site is received.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment including a plurality of sites, each site including one or more distributed services, each distributed service configured to register clients when the distributed service is available, some clients including the ability to ping distributed services and register directly with remote sites that respond to a ping, other clients including the additional ability to receive an indication indicating a next most optimal site in response to a ping and to register with a specified distributed service at the indicated next most optimal site, a method of registering a client with a distributed service located at a next most optimal site when the distributed service at the client's local site is not available for use by the client, the method comprising:
    the client first attempting to register with a distributed service at the local site and the client ascertaining that the distributed service at the local site is unavailable;
    the client thereafter randomly selecting a distributed service at a remote site and then sending a ping to the randomly selected distributed service, the ping including a flag indicating the client's additional ability to receive an indication of a distributed service located at a next most optimal remote site and register with a specified distributed service at the indicated next most optimal site, the flag alerting the randomly selected distributed service to the client's additional ability to receive indications indicating next most optimal sites and register with specified distributed services such that the randomly selected distributed service refrains from attempting to register the client in response to receiving the ping;
    the client receiving a message back from the randomly selected distributed service that was pinged, the message specifying a distributed service located at a next most optimal remote site, the randomly selected distributed service having sent the message in response to being alerted to the additional ability indicated by the flag,
        wherein the next most optimal remote site is determined for the client by referencing a mapping table which includes indexes used to determine an index number for a link between the client and various other distributed services at other remote sites, and then determining from the mapping table, based on a link having the best index number, the next most optimal remote site for providing distributed service,
        each index being derived by using a combination of one or more of: physical proximity of the client to the optimal remote site, monetary cost of a link connecting the client to the optimal remote site, reliability of the link, latency and performance of the link, user preferences, security of the link, network equipment, administrative costs, bandwidth of the link or, conflicting uses of the link; and
    the client thereafter sending a message to the distributed service located at the next most optimal site and registering with the distributed service located at the next most optimal remote site.

2. The method of claim 1, wherein the next most optimal remote site is determined by identifying the local site by reference to an IP address of the client.

3. The method of claim 1, wherein the distributed service at the next most optimal remote site comprises a domain controller.

4. The method of claim 1, wherein the message received from the random distributed service is a UDP message.

5. The method of claim 1, further comprising reverting to a random pinging of other distributed services located at other remote sites if no message indicating a next most optimal remote site is received in response to the ping sent to the selected random distributed service.

6. In a network computing environment including a plurality of sites, each site including one or more distributed services, each distributed service configured to register clients when the distributed service is available, some clients including the ability to ping distributed services and register directly with remote sites that respond to a ping, other clients including the additional ability to receive an indication indicating a next most optimal site in response to a ping and to register with a specified distributed service at the indicated next most optimal site, a method of locating a distributed service at a next most optimal site when the distributed service at a client's local site is not available for use by the client, wherein the client is one of the other clients including the additional ability to receive an indication indicating a next most optimal site and to register with a specified distributed service at the indicated next most optimal site, the method comprising:

at a distributed service located at one of the plurality of sites, receiving a ping from the client, the ping including a flag indicating the client's ability to receive an indication of a distributed service located at a next most optimal remote site, the ping indicating that the client randomly selected the distributed service in response to a distributed service at the client's local site being unavailable, the flag indicating the client's additional ability to receive indications indicating next most optimal sites and register with specified distributed services such that the distributed service refrains from attempting to register the client in response to receiving the ping;

at the distributed service receiving the ping, referencing a mapping table which includes indexes used to determine an index number for a link between the client and various other distributed services at other remote sites,         wherein each index is derived by using a combination of one or more of: physical proximity of the client to the optimal remote site, monetary cost of a link connecting the client to the optimal remote site, reliability of the link, latency and performance of the link, user preferences, security of the link, network equipment, administrative costs, bandwidth of the link or, conflicting uses of the link;

the distributed service that received the ping then determining from the mapping table, based on link having the best index number, the next most optimal remote site for providing distributed service for the client; and     the distributed service sending a message to the client, the message specifying the location and link information for the next most optimal remote site for providing distributed service for the client.

7. The method of claim 6, wherein the method further comprising identifying the next most optimal remote site by selecting the lowest index in the mapping table.

8. The method of claim 6, wherein the ping includes an IP address of the client.

9. The method of claim 6, wherein the distributed service at the next most optimal remote site comprises a domain controller.

10. The method of claim 6, wherein sending a message to the client comprises sending a UDP message.

11. In a network computing environment including a plurality of sites, each site including one or more distributed services, each distributed service configured to register clients when the distributed service is available, some clients including the ability to ping distributed services and register directly with remote sites that respond to a ping, other clients including the additional ability to receive an indication indicating a next most optimal site in response to a ping and to register with a specified distributed service at the indicated next most optimal site, a computer program product comprised of computer storage media on which executable instructions are stored for implementing a method of registering a client with a distributed service located at a next most optimal site when the distributed service at the client's local site is not available for use by the client, and wherein the method comprises:

the client first attempting to register with a distributed service at the local site and the client ascertaining that the distributed service at the local site is unavailable;

the client thereafter randomly selecting a distributed service at a remote site and then sending a ping to the randomly selected distributed service, the ping including a flag indicating the client's additional ability to receive an indication of a distributed service located at a next most optimal remote site and register with a specified distributed service at the indicated next most optimal site, the flag alerting the randomly selected distributed service to the client's additional ability to receive indications indicating next most optimal sites and register with specified distributed services such that the randomly selected distributed service refrains from attempting to register the client in response to receiving the ping;

the client receiving a message back from the randomly selected distributed service that was pinged, the message specifying a distributed service located at a next most optimal remote site, the randomly selected distributed service having sent the message in response to being alerted to the additional ability indicated by the flag, wherein the next most optimal remote site is determined for the client by referencing a mapping table which includes indexes used to determine an index number for a link between the client and various other distributed services at other remote sites, and then determining from the mapping table, based on a link having the best index number, the next most optimal remote site for providing distributed service,     each index being derived by using a combination of one or more of: physical proximity of the client to the optimal remote site, monetary cost of a link connecting the client to the optimal remote site, reliability of the link, latency and performance of the link, user preferences, security of the link, network equipment, administrative costs, bandwidth of the link or, conflicting uses of the link; and     the client thereafter sending a message to the distributed service located at the next most optimal site and registering with the distributed service located at the next most optimal remote site.

12. In a network computing environment including a plurality of sites, each site including one or more distributed services, each distributed service configured to register clients when the distributed service is available, some clients including the ability to ping distributed services and register directly with remote sites that respond to a ping, other clients including the additional ability to receive an indication indicating a next most optimal site in response to a ping and to register with a specified distributed service at the indicated next most optimal site, a computer program product comprised of computer storage media on which executable instructions are stored for implementing a method of locating a distributed service at a next most optimal site when the distributed service at a client's local site is not available for use by the client, wherein the client is one of the other clients including the additional ability to receive an indication indicating a next most optimal site and to register with a specified distributed service at the indicated next most optimal site, and wherein the method comprises:

at a distributed service located at one of the plurality of remote sites selected by the client, receiving a ping from the client, the ping including a flag indicating the client's ability to receive an indication of a distributed service located at a next most optimal remote site, the ping indicating that the client randomly selected the distributed service in response to a distributed service at the client's local site being unavailable, the flag indicating the client's additional ability to receive indications indicating next most optimal sites and register with specified distributed services such that the distributed service refrains from attempting to register the client in response to receiving the ping;

at the distributed service receiving the ping, referencing a mapping table which includes indexes used to determine an index number for a link between the client and various other distributed services at other remote sites, wherein each index is derived by using a combination of one or more of: physical proximity of the client to the optimal remote site, monetary cost of a link connecting the client to the optimal remote site, reliability of the link, latency and performance of the link, user preferences, security of the link, network equipment, administrative costs, bandwidth of the link or, conflicting uses of the link;

the distributed service that received the ping then determining from the mapping table, based on link having the best index number, the next most optimal remote site for providing distributed service for the client; and the distributed service sending a message to the client, the message specifying the location and link information for the next most optimal remote site for providing distributed service for the client.

\* \* \* \* \*